United States Patent [19]

Shadman et al.

[11] 4,346,557

[45] Aug. 31, 1982

[54] INCINERATION-CLEANABLE COMPOSITE DIESEL EXHAUST FILTER AND VEHICLE EQUIPPED THEREWITH

[75] Inventors: Farhang Shadman, Tucson, Ariz.; Louis Hegedus, Grosse Pointe Woods, Mich.

[73] Assignee: General Motors Corporation, Detroit, Mich.

[21] Appl. No.: 147,599

[22] Filed: May 7, 1980

[51] Int. Cl.$^3$ .................... F01N 3/02; B01D 41/04; B01D 50/00
[52] U.S. Cl. ................................. 60/311; 55/482; 55/486; 55/523; 55/DIG. 30
[58] Field of Search .................. 60/311; 55/DIG. 10, 55/DIG. 30, 482, 486, 523

[56] References Cited

U.S. PATENT DOCUMENTS

| | | | |
|---|---|---|---|
| 1,781,254 | 11/1930 | Stelzner | 55/486 |
| 3,252,270 | 5/1966 | Pall | 55/486 |
| 3,290,870 | 12/1966 | Jensen | 55/486 |
| 3,937,015 | 2/1976 | Akado | 55/523 |
| 4,211,075 | 7/1980 | Ludecke | 60/303 |
| 4,276,071 | 6/1981 | Outland | 55/DIG. 30 |

FOREIGN PATENT DOCUMENTS 631072 11/1961 Canada ........................... 55/486

*Primary Examiner*—Douglas Hart
*Attorney, Agent, or Firm*—Robert J. Outland

[57] ABSTRACT

A composite exhaust filter particularly for use in diesel engine powered vehicles includes first and second filter sections disposed in series. The first filter section is a high-temperature depth-type filter material capable of collecting exhaust particulates with moderate efficiency while the second filter section is a high-temperature ceramic wall-flow monolith capable of collecting exhaust particulates on an extended gas porous surface with high efficiency. The vehicle system is provided with means such as an inlet throttle for increasing exhaust gas temperature to the ignition point of the collected particulates. Combustion initiated in the depth type first filter section generates a substantial amount of added heat which is carried to the second filter section, raising the surface temperature to a point where the particulates in the latter section are also incinerated.

3 Claims, 2 Drawing Figures

INCINERATION-CLEANABLE COMPOSITE DIESEL EXHAUST FILTER AND VEHICLE EQUIPPED THEREWITH

TECHNICAL FIELD

This invention relates to engine exhaust filters and particularly to diesel engine exhaust particulate filters capable of being cleaned by incineration of the collected particulates. The invention further relates to diesel engine powered vehicles having exhaust gas filters and means for increasing the exhaust temperature for periodic incineration of the collected particulates in such filters.

BACKGROUND

A great deal of interest is presently being given to the problem of limiting the mass of particulate matter emitted with the exhaust gases from diesel and other internal combustion engines. In the case of diesel engines, work is under way to develop practical and efficient devices and methods for reducing emissions of the largely carbonaceous particulates present in the diesel engine exhaust gases.

It is recognized that one method for accomplishing this purpose is to provide suitable particulate traps such as filters in the engine or vehicle exhaust systems. Two types of filters that have been considered for this application are depth-type filters and wall-flow monolithic filters. The depth-type filters can relatively easily be regenerated in use by incineration. However, high-efficiency depth-type filters have a high pressure drop. Wall-flow monoliths, on the other hand, can provide high efficiency at low pressure drops. U.S. patent applications Ser. Nos. 99,933 now abandoned and 99,935 now U.S. Pat. No. 4,276,071, both filed Dec. 3, 1979 and assigned to the assignee of the present invention, disclose certain forms of ceramic wall-flow monoliths capable of highly efficient filtration of engine exhaust particulates, including the largely carbonaceous particulates present in diesel engine exhaust. Experience has shown, however, that the incineration cleaning of wall-flow monolithic filters is difficult. Methods used for ignition and combustion of deposits during operation of depth filters have not given satisfactory incineration in monoliths. Therefore, new approaches are required to design a filter with the combined properties of low pressure drop, high efficiency and acceptable regenerability.

SUMMARY OF THE INVENTION

The present invention results from studies by the inventors and the resultant recognition of the apparent problem involved. It was concluded that, as the exhaust gas temperature into a depth-type filter is raised, the deposit reaches the ignition temperature in a zone inside the filter. The heat generated by combustion in this zone spreads out and reaction fronts are formed which move towards the filter ends as the deposit burns. This process is fast and is self-sustained by the heat of the combustion reactions. Wall-flow monoliths, on the other hand, show a completely different response to the increase in exhaust temperature. The gas in wall-flow monoliths passes through a thin layer of deposit spread over a large area. Therefore, the heat generated by reaction is distributed throughout the filter rather than being accumulated in a narrow reaction zone. This means that local ignition and self-sustained combustion as observed in depth-type filters, is not possible in wall-flow monolithic filters. Therefore, regeneration of wall-flow monoliths is difficult because it requires auxiliary heat greater than what can be normally provided by engine throttling.

The present invention provides a composite filter structure of high efficiency and low pressure drop with extended service life and increased particulate carrying capacity, as well as improved capability for incineration cleaning as compared to simple filter elements of the wall-flow monolith and other known types.

Filter elements in accordance with the invention include first and second series-connected filter sections. The first section is a moderate efficiency depth-type filter of high temperature capability made from any suitable material such as metal or ceramic fiber or through-flow ceramic monolith. The second filter section is a high-temperature wall-flow monolith, preferably of the porous ceramic type, with an extended filter surface area. When used with diesel engines, a substantial portion of the exhaust particulates are collected in the first (depth-type) filter section and most of the remaining particulates passing therethrough are collected by the subsequent wall-flow monolith filter section.

The combination of the two sections in a single filter provides the benefits of increased capacity and extended life with high efficiency and low pressure drop in a degree superior to that obtainable with either type of filter material used separately.

Cleaning the composite filter of diesel exhaust particulates may be accomplished by raising the engine exhaust gas temperature to a point where ignition of the collected particulates takes place in the first filter section. The heat of incineration spreads rapidly through the collected particulates in the depth-type filter section and raises the temperature of the exhaust gas passing therethrough to above the particulate incineration temperature. Subsequent passage of the gas through the wall-flow monolith filter section then heats the particulates in this filter section to their incineration temperature. In this manner, the collected particulates are incinerated over a major portion of the filter surfaces in both the first and second filter sections.

These and other features and advantages of the invention will be more fully understood from the following description of a preferred embodiment taken together with the accompanying drawing.

BEST MODE DESCRIPTION

Figure 1:
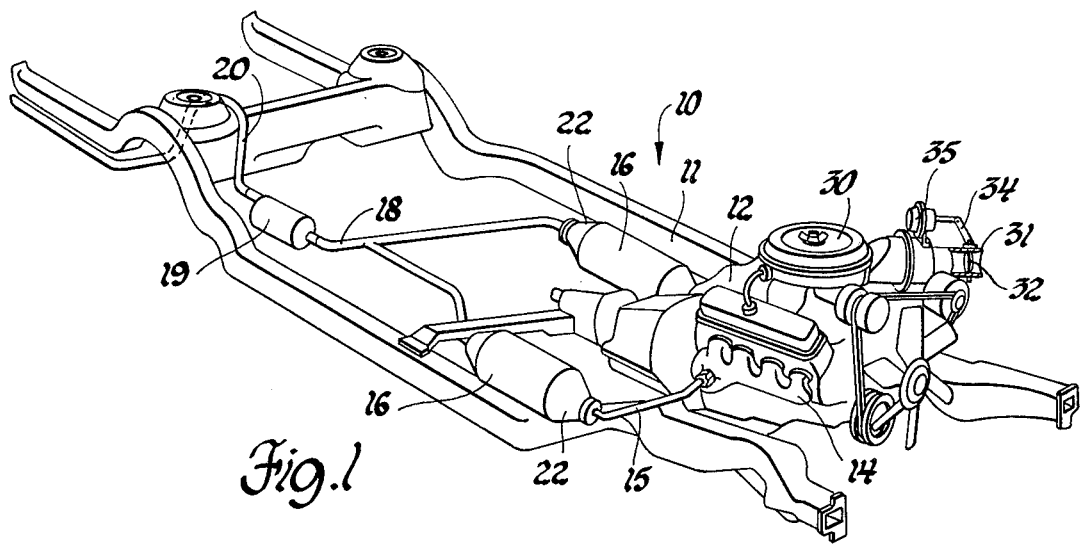
FIG. 1 is a pictorial view of an automotive vehicle chassis mounting a diesel engine and an associated vehicle exhaust system provided with composite diesel exhaust filters and incineration means in accordance with the invention.

Referring now to the drawing in detail. Numeral 10 generally indicates an automotive vehicle including a chassis 11 only portions of which are shown. The chassis 11 mounts a vee-type diesel engine 12 which includes a pair of cylinder banks each mounting an exhaust manifold 14 only one of which is shown.

Each exhaust manifold connects through a suitable exhaust pipe 15 with an exhaust particulate trap 16. Each trap is suitably supported in the vehicle chassis by means not shown and is adapted to collect particulates in the exhaust gases delivered to the traps from the cylinders of their respective cylinder banks. The outlets of the traps 16 are connected through a wye pipe 18 with a muffler 19 which in turn connects through a tailpipe 20 with the rear of the vehicle where the exhaust gases are expelled to atmosphere.

Figure 2:
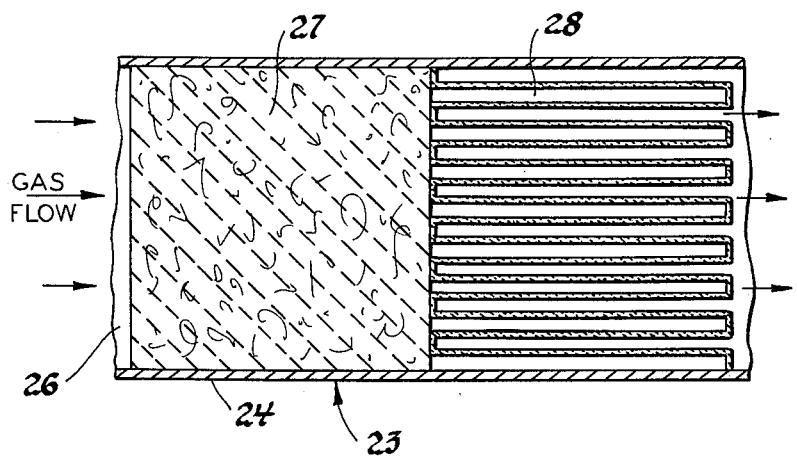
FIG. 2 is a cross-sectional view through one of the composite filters mounted in the vehicle of FIG. 1 and formed in accordance with the invention.

Each of the particulate traps 16 includes a housing 22 which may be of any suitable form of construction and configuration. Within the housing there is disposed a high-efficiency incineration-cleanable composite filter element formed in accordance with the invention and preferably of the type illustrated in FIG. 2 and generally indicated by numeral 23. Element 23 may include an outer shell 24 which defines a flow path 26 for exhaust gases passing in the direction of the arrows. Within the shell 24, the housing is provided with a pair of distinctive first and second filter element sections 27, 28 respectively, disposed for exhaust gas flow in series through the first and then through the second section.

The first filter section 27 is formed of a through-flow depth-type filter material which is capable of collecting diesel exhaust particulates with moderate efficiency and pressure drop at locations throughout the path of gas flow through the first section. Such material may, for example, include compacted high-temperature steel wire, fibrous ceramic, through-flow monolithic ceramic and other suitable materials. The first filter section thus provides a depth-type medium porous to gas flow with surfaces for collecting particulates at all levels from the inlet to the outlet of the first, or primary, section.

The second filter section 28 is preferably formed of an extended surface wall-flow type monolithic structure preferably made of high-temperature ceramic and capable of collecting diesel particulates on the upstream filter surfaces with very high efficiency and low pressure drop due to the extended filter surface. The filter element is preferably of a form similar to that disclosed in FIG. 2 of the previously mentioned U.S. patent applications Ser. Nos. 99,933 and 99,935.

In operation of the vehicle 10, engine 12 emits exhaust gases which are passed through the exhaust pipes 15 and the exhaust particulate traps 16 wherein are the composite exhaust filters 23. Within each filter 23 the exhaust gas initially passes through the first filter section 27 where substantial portions of the particulates, which are largely carbonaceous in nature, are collected on the interlaced surfaces of the porous filter medium. Subsequently the partially filtered exhaust gas is passed through the second filter section 28 wherein the majority of the remaining exhaust particulates are collected on the extended wall surfaces of the monolithic-type filter element. The cleaned exhaust gas then passes out of the filter to the vehicle exhaust system from which it escapes to atmosphere.

At periodic intervals, or whenever the collection of exhaust particulates in the filters 23 reaches levels approaching the point of excessive pressure drop, the filter elements must be replaced or cleaned. Preferably the vehicle system is arranged to provide for cleaning of the filter elements by incineration of the particulates with the filters in use. This may be accomplished by raising the exhaust gas temperature to a level at or near the incineration point of the collected particulates. The latter may be accomplished, for example, by throttling the inlet of the diesel engine during operation as is described, for example, in U.S. patent application Ser. No. 952,710 now U.S. Pat. No. 4,211,075 filed Oct. 19, 1978 and assigned to the assignee of the present invention.

For the foregoing purpose, the engine 12 of vehicle 10 is preferably provided with an induction system including an air cleaner 30 having an inlet snorkel 31 in which there is disposed a throttle valve 32. Valve 32 is connected via a linkage 34 with a vacuum actuating motor 35 of the diaphragm type for the purpose of moving the throttle valve 32 between open and closed positions. Suitable control means not shown may be provided for operating the vacuum motor 35 when throttling of the engine inlet is desired.

To accomplish cleaning of the filter elements, the vacuum motor 35 is operated to partially close the throttle 32 so as to restrict the flow of air into the engine. This in turn increases the temperature of exhaust gases leaving the engine to a point where the exhaust gas entering the filter elements 23 reaches a temperature at which particulates collected in the filters may be ignited.

Typically, ignition of particulates begins at points somewhere in the center of the first filter sections 27. Thereafter, the gas temperature surrounding the points of ignition increases rapidly due to combustion of the particulates and the continued passage of oxygen rich exhaust gases through the filters. As the temperature is raised, the particulates collected in the first filter sections burn across expanding fronts extending laterally outwardly as well as upstream and downstream of the points of ignition. This combustion substantially increases the temperature of the exhaust gases delivered to the second filter sections 28 so that the carbonaceous particulates collected on the surfaces of the wall-flow monoliths are also increased to their ignition temperature. Thus, the particulates collected over the surfaces of the monoliths are ignited at one or more points and rapidly burned.

When the incineration of the particulates is complete, combustion ceases and the filters are cleaned ready to again collect a fresh load of particulates. At this time, or prior thereto after the initiation of combustion, the vacuum motor is returned to the normal position, opening the inlet throttle 32 and allowing a full charge of fresh air into the engine without restriction.

While the invention has been disclosed by reference to a specific embodiment chosen for purposes of illustration, it should be understood that numerous changes could be made within the scope of the inventive concepts described. Accordingly the invention is not intended to be limited except by the language of the following claims.

The embodiments of the invention in which an exclusive property or privilege is claimed are defined as follows:

1. A composite incineration-cleanable diesel exhaust particulate filter comprising
    first and second filter sections capable of withstanding exhaust system and particulate incineration temperatures and disposed in series to provide for diesel exhaust gas flow through the first and then the second filter sections,
    said first filter section comprising a high temperature-resistant through-flow depth-type filter material capable of collecting diesel exhaust particulates with moderate efficiency and pressure drop at many locations along interconnected paths of gas flow through said first section, and said second filter section comprising a high temperature-resistant wall-flow monolith structure having an extended gas-porous wall surface capable of collecting diesel particulates thereon with relatively high efficiency and low pressure drop, said filter being incineration-cleanable while installed by heating the exhaust gas supplied to the filter to a temperature adequate to burn particulates collected in the first filter section whereby the gas temperature in the second section is raised to a level adequate to incinerate particulates collected therein.

2. In combination in an automotive vehicle, a diesel engine having an exhaust gas outlet a composite incineration-cleanable filter connected to said outlet and including first and second filter sections capable of withstanding diesel exhaust and particulate incineration temperatures and arranged in series to pass exhaust gases from said outlet serially through said first section and then said second section, said first filter section comprising a high temperature-resistant through-flow depth-type filter material capable of collecting diesel exhaust particulates with moderate efficiency and pressure drop at numerous locations along interconnected paths of gas flow through said first section, said second filter section comprising a high temperature-resistant wall-flow monolith structure having an extended gas-porous wall surface capable of collecting diesel particulates thereon with relatively high efficiency and low pressure drop, and means in said vehicle operative periodically during engine operation to elevate the exhaust gas temperature supplied to said composite filter to a level adequate to burn particulates collected in the first filter section whereby the gas temperature in the second filter section is raised to a level adequate to incinerate particulates collected therein.

3. A filter as defined in claims 1 or 2 wherein the wall-flow monolith of said second filter section is formed of a ceramic material and the depth-type filter material of said first filter section consists of a compacted fibrous material.

* * * * *